United States Patent
Irby et al.

(10) Patent No.: US 7,523,357 B2
(45) Date of Patent: *Apr. 21, 2009

(54) MONITORING SYSTEM AND METHOD

(75) Inventors: Annette Garland Irby, Clover, VA (US); Richard Philip Lacks, Raleigh, NC (US); Lisa Hayes Magee, Cary, NC (US); Timothy Wayne Owings, Lake Worth, FL (US); Tarn Martin Rosenbaum, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 11/338,510

(22) Filed: Jan. 24, 2006

(65) Prior Publication Data

US 2007/0174732 A1 Jul. 26, 2007

(51) Int. Cl.
*G06F 11/00* (2006.01)
(52) U.S. Cl. .............................. 714/47; 714/25; 714/39; 714/48
(58) Field of Classification Search .................. 714/25, 714/39, 47, 48
See application file for complete search history.

(56) References Cited

U.S. PATENT DOCUMENTS

| 6,070,190 | A | 5/2000 | Reps et al. |
| 6,714,976 | B1 | 3/2004 | Wilson et al. |
| 6,754,664 | B1 | 6/2004 | Bush |
| 2007/0174716 | A1* | 7/2007 | Erdtmann et al. ............. 714/39 |

OTHER PUBLICATIONS

Schulz, et al.; Owl: Next Generation System Monitoring; Association for Computing Machinery; ACM 1-59593-019-1/05/0005; pp. 116-124, May 2005.
Joyce; et al.; Monitoring Distributed Systems; ACM Transactions on Computer Systems, vol. 5, No. 2, May 1987; pp. 121-150.
Garfinkel, et al.; Terra: A Virtual Machine-Based Platform for Trusted Computing; SOSP'03, Oct. 19-22, 2003, Bolton Landing, New York, USA. ACM 1-58113-757-5/03/0010; pp. 193-206.
Hossain, A.; An intelligent sensor network system coupled with statistical process model for predicting machinery health and failure; Slcon/02; Sensors for Industry Conference; Proceedings of the ISA/IEEE; Sensors for Industry Conference (IEEE Cat. No. 02EX626); pp. 52-56, Nov. 2002.
Coll, B.; The search for yield improvement: quality metrics in the EMS industry; Surface Mount International Conference and Exposition; SMI 98. Proceedings; pp. 525-533, Aug. 1998.

* cited by examiner

*Primary Examiner*—Robert Beausoliel
*Assistant Examiner*—Charles Ehne
(74) *Attorney, Agent, or Firm*—Schmeiser, Olsen & Watts; John R. Pivnichny

(57) ABSTRACT

A monitoring system and method. The monitoring system receives specified rules related to at least one component within a computing system. The monitoring system receives first data comprising information related to at least one component within a computing system. The monitoring system comprises a repository. The first data is stored within the repository. The first data is analyzed by the monitoring system using specified rules to determine a first health status of the at least one component. The monitoring server indicates for a user the first health status.

52 Claims, 7 Drawing Sheets

MONITORING SYSTEM AND METHOD

BACKGROUND OF THE INVENTION

1. Technical Field

The present invention relates to a system and associated method for monitoring components within a computing system.

2. Related Art

A system typically requires all components within the system to function within specific parameters. Periodically, some components within a system do not function within specific parameters thereby causing the system to malfunction. Therefore there exists a need for monitoring components within a system to determine if all of the components are functioning within specific parameters.

SUMMARY OF THE INVENTION

The present invention provides a method, comprising:

receiving, by a monitoring system, specified rules related to at least one component within a computing system, said monitoring system comprising a repository;

receiving, by said monitoring system, first data comprising information related to said at least one component within said computing system;

storing said first data within said repository;

analyzing, by said monitoring system, said first data within said repository using said specified rules to determine a first health status of said at least one component; and indicating, by said monitoring system, said first health status.

The present invention provides a monitoring system comprising a processor coupled to a computer-readable memory unit, said memory unit comprising a repository and instructions that when executed by the processor implement an monitoring method, said method comprising;

receiving, by said monitoring system, specified rules related to at least one component within a computing system, said monitoring system comprising a repository;

receiving, by said monitoring system, first data comprising information related to said at least one component within said computing system;

storing said first data within said repository;

analyzing, by said monitoring system, said first data within said repository using said specified rules to determine a first health status of said at least one component; and indicating, by said monitoring system, said first health status.

The present invention provides a computer program product, comprising a computer usable medium including a repository and a computer readable program code embodied therein, said computer readable program code comprising an algorithm adapted to implement an monitoring method within a monitoring system, said method comprising:

receiving, by said monitoring system, specified rules related to at least one component within a computing system, said monitoring system comprising a repository;

receiving, by said monitoring system, first data comprising information related to said at least one component within said computing system;

storing said first data within said repository;

analyzing, by said monitoring system, said first data within said repository using said specified rules to determine a first health status of said at least one component; and indicating, by said monitoring system, said first health status.

The present invention provides a process for integrating computing infrastructure, comprising integrating computer-readable code into a monitoring system, wherein the code in combination with the monitoring system is capable of performing a method comprising:

receiving, by said monitoring system, specified rules related to at least one component within a computing system, said monitoring system comprising a repository;

receiving, by said monitoring system, first data comprising information related to said at least one component within said computing system;

storing said first data within said repository;

analyzing, by said monitoring system, said first data within said repository using said specified rules to determine a first health status of said at least one component; and indicating, by said monitoring system, said first health status.

The present invention advantageously provides a system and associated method for monitoring components within a system to determine if all of the components are functioning within specific parameters.

DETAILED DESCRIPTION OF THE INVENTION

Figure 1:
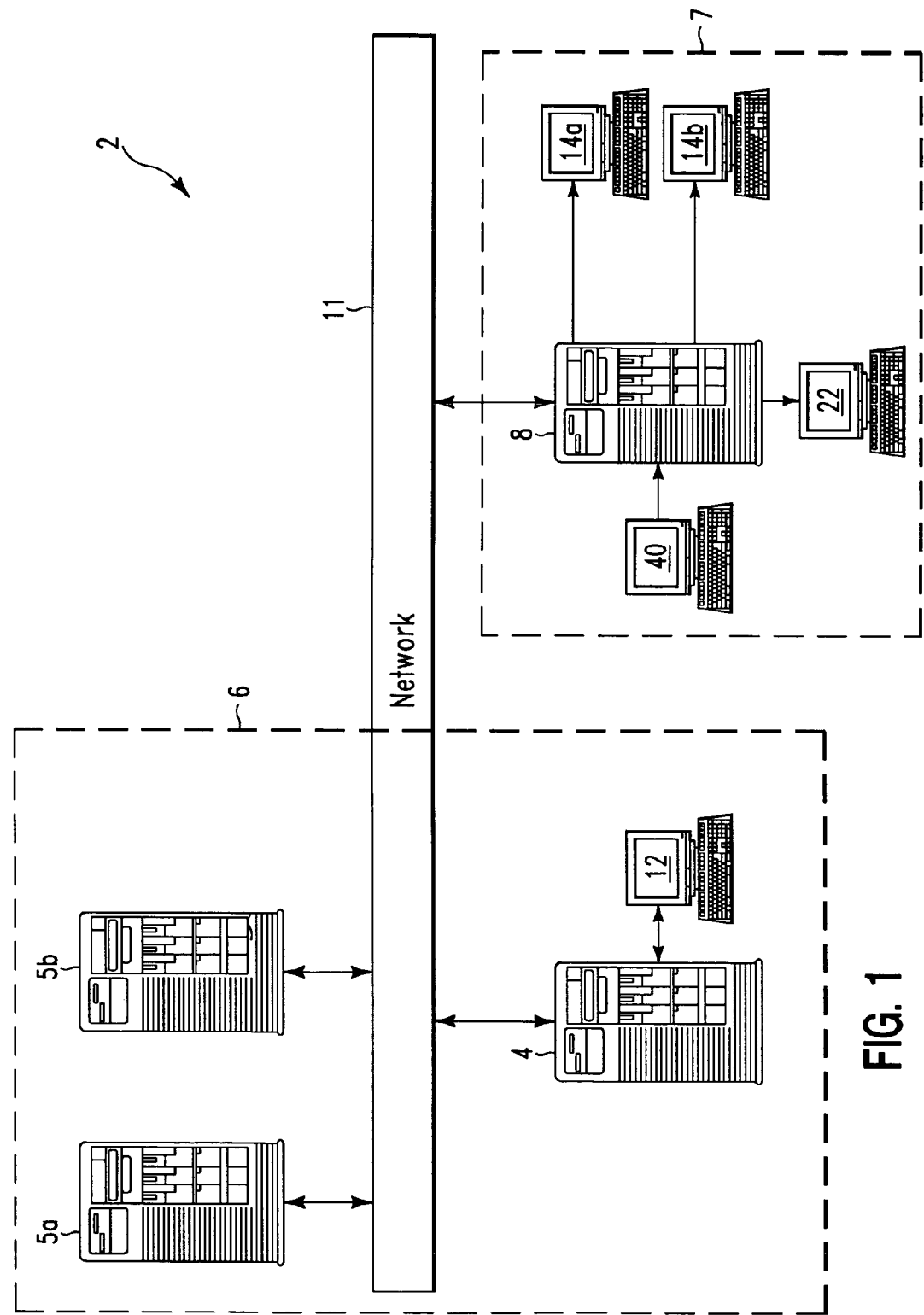
FIG. 1 illustrates a block diagram view of a system comprising a monitoring system and a computing system, in accordance with embodiments of the present invention.

FIG. 1 illustrates a block diagram view of a system 2 comprising a monitoring system 7 and a computing system 6, in accordance with embodiments of the present invention. The computing system 6 may comprise a computing system used for a business(s) (e.g., a retailer, a bank, a computer software company, etc). The computing system 6 comprises a central computing system 4 connected to partner computing systems 5a and 5b through a network 11. The network 11 may comprise any type of network known to a person of ordinary skill in the art including, inter alia, a local area network, (LAN), a wide area network (WAN), the Internet, etc. The partner computing systems 5a and 5b and end users (i.e., through terminal 12) may access the central computing system 4 to obtain information stored within the central computing system 4 (e.g., customer data, inventory data, etc). Periodically, problems may occur across hardware components, (e.g., central computing system 4, partner computing systems 5a and 5b, etc) software components, (e.g., software applications, data, dataflow, etc), and interfaces (e.g., network connections) associated with the computing system 6 thereby causing a malfunction within the computing system 6. Therefore, the present invention provides a monitoring system 7 for providing real time hardware/software system (i.e., for computing system 6) health status updates and issuing alerts (i.e., if a threshold is exceeded with a component within computing system 6, if a malfunction with a component within computing system 6 is detected, etc) to appropriate support personnel (e.g., hardware support, software support, etc) so that the exceeded threshold or malfunction may be repaired. Additionally, the monitoring system 7 may automatically generate user defined corrective actions if a malfunction is detected. A health status for the computing system 6 (i.e., for components within computing system 6) is defined herein as an operational status for any hardware components, software components, (e.g., software applications, data, dataflow, etc), and interfaces (e.g., network connections) associated with the computing system 6. For example, a health status may comprise, inter alia, a network 11 connection status (e.g., network 11 connection enabled), a status for data within computing system 6 (e.g., missing data, incorrect data, data comprising an incorrect format, thresholds related to data exceeded, etc), etc. The monitoring system 7 comprises a monitoring server 8 and terminals 14a, 14b, 22, and 40. The computing system 6 comprises software tools (e.g., see agent 29 and agent 33 in FIGS. 3-5) for monitoring hardware components, software components, (e.g., software applications, data, dataflow, etc), and interfaces (e.g., network connections) within the computing system 6. The software tools retrieve monitoring data (e.g., query queues data, log errors data, logs related to data throughput) from the hardware components, software components, and interfaces within the computing system 6 and generate (i.e., from the monitoring data) formatted messages (herein referred to as events) describing the monitoring data. Examples of types of data comprised by the monitoring data are illustrated as follows:

Application Specific Data

Data specifying if a web service is available for the computing system 6.

Graphical user interface response times data.

Missing or incorrect data (e.g., data not received, data received in a wrong format, etc).

System Health Data

Connections between central computing system 4 and partner computing systems 5a and 5b active.

Data through-put rate between central computing system 4 and partner computing systems 5a and 5b.

The computing system 6 transmits the events to the monitoring server 8. Monitoring server 8 receives and analyzes the events to determine when user (e.g., support personnel) defined critical thresholds (e.g., queue time too long, data flow rate too slow, etc) are reached or errors (e.g., network 11 connection disabled, incorrect data format, etc) occur. Additionally, the monitoring server 8 uses the events to continuously provide health status updates related to the hardware/software components, interfaces, and operational data within the computing system 6. The updates are displayed on terminals 14a ... 14b. Support personnel is notified or alerted (i.e., through terminal 22) by the monitoring server 8 if a malfunction is detected or a user (e.g., support personnel) defined critical threshold is reached. User defined critical thresholds may be inputted into monitoring server 8 using the input terminal 40. The monitoring server 8 continuously combines and analyzes the events and uses business or system logic to update operational console software (e.g., update console tool 49 in FIG. 5) with a current status and health of components (i.e., hardware, software, data, etc) and processes within computing system 6. When application and system specific critical events occur within the computing system 6, a notification is sent to support personnel. The notification may be sent by, inter alia, e-mail, text message, etc.

Figure 2:
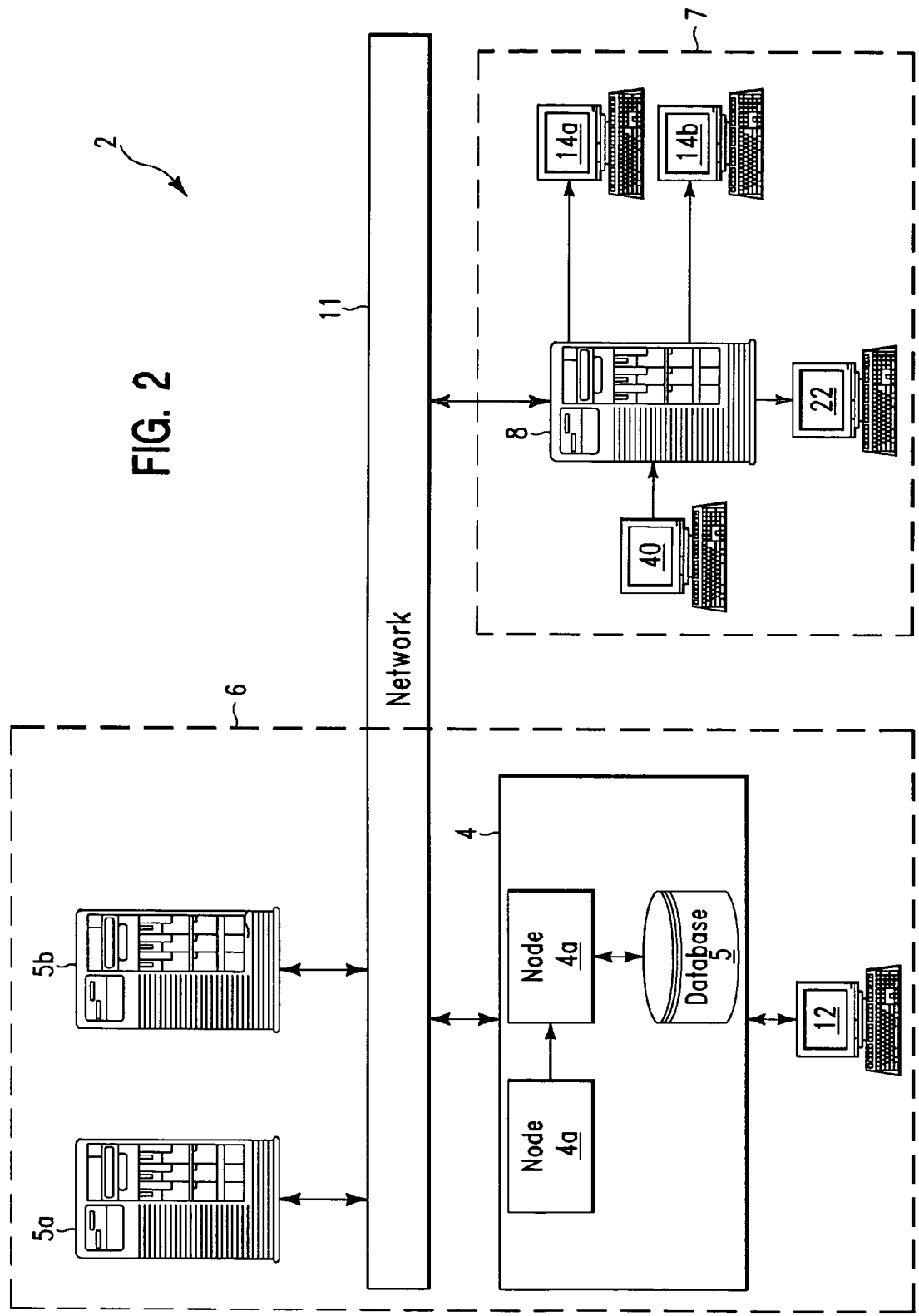
FIG. 2 illustrates a block diagram view of the system of FIG. 1 comprising an exploded view of the central computing system, in accordance with embodiments of the present invention.

FIG. 2 illustrates a block diagram view of the system 2 of FIG. 1 comprising an exploded view of the central computing system 4, in accordance with embodiments of the present invention. Note that the exploded view of the central computing system 4 is an example and that the central computing system 4 may comprise alternative configurations. The central computing system 4 comprises nodes 4a and 4b (e.g., servers) and a database 5 for performing specified functions. The node 4a may comprise a gateway server. The node 4b may comprise a process queue server. Node 4a receives (i.e., from partner computing system 5a and/or 5b) monitoring data related to load files. Node 4a timestamps (i.e., with an arrival time) the load files and generates an event specifying an arrival time. The event is transmitted to the monitoring server 8. The monitoring server 8 formats the event for transmission to terminal 14a so that support personnel may monitor the arrival time for load files. Node 4b receives (i.e., node 4a) monitoring data related to an arrival of events and generates an event specifying a load file line. The event is transmitted to the monitoring server 8. The monitoring server 8 formats the event for transmission to terminal 14a so that support personnel may monitor load file lines.

Figure 3:
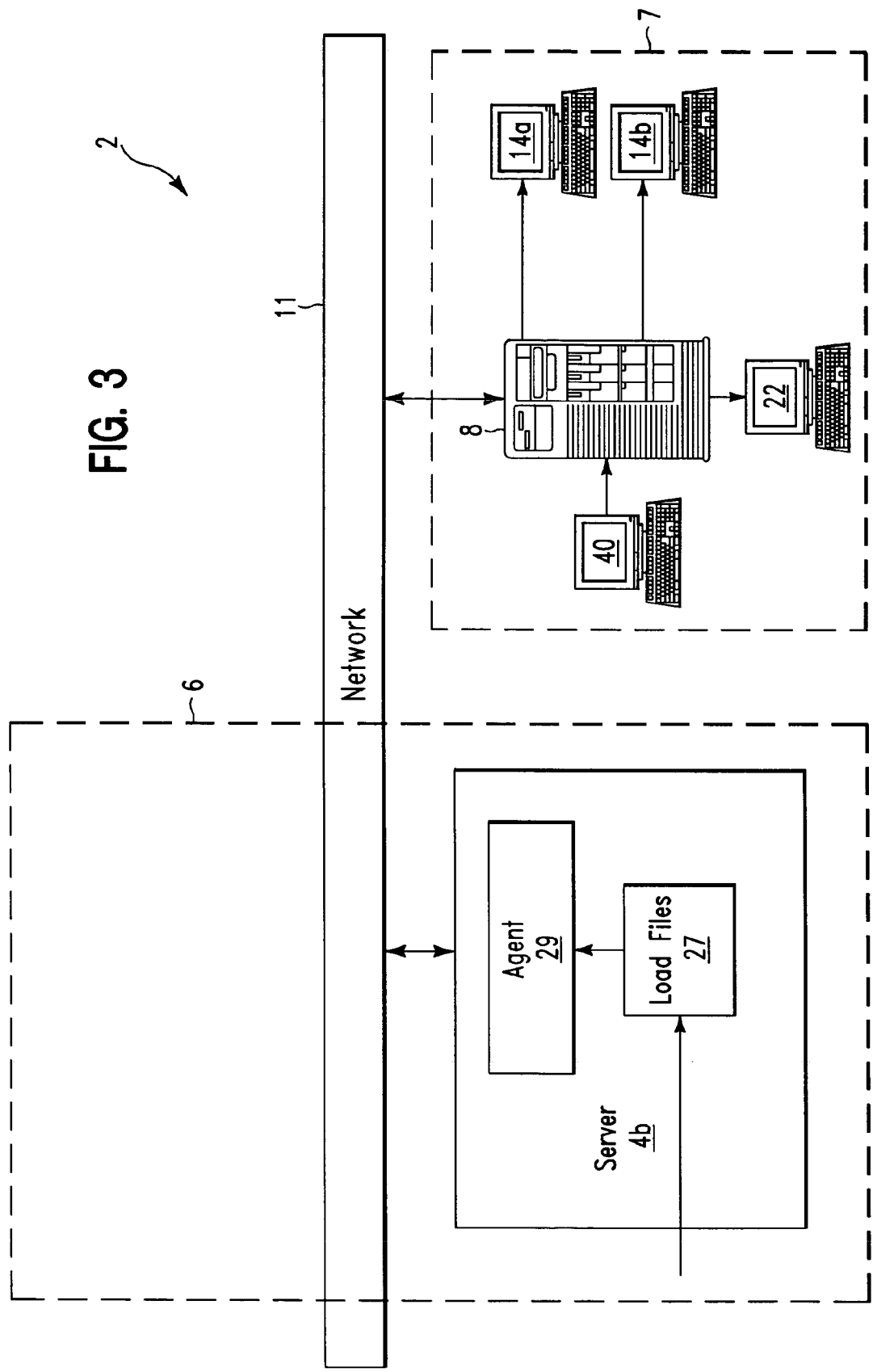
FIG. 3 illustrates a block diagram view of the system of FIG. 1 comprising an exploded view of a first node comprising an agent, in accordance with embodiments of the present invention

FIG. 3 illustrates a block diagram view of the system 2 of FIG. 1 comprising an exploded view of node 4a comprising agent 29, in accordance with embodiments of the present invention. Note that the exploded view of the node 4a comprising agent 29 is an example and that the node 4a may comprise alternative configurations (e.g., multiple agents, etc). An agent is defined herein as software (e.g., a computer program) that retrieves data. FIG. 3 depicts how an agent (e.g., agent 29) on a gateway node (e.g., node 4a) monitors the arrival of load files 27 from partner computing system 5a or 5b and generates a timestamp specifying an arrival time for the load files 27. The agent 29 continuously monitors the computing system 6 for new load files 27 and records an arrival time. The agent 29 interfaces to the monitoring server 8 and transmits (i.e., to the monitoring server 8) an event indicating a load file 27 arrival times. The event will be stored in a repository within the monitoring server 8 (e.g., see repository 44 in FIG. 5). Additionally, the event is transmitted to terminal 14a so that support personnel may monitor load file 27 arrival times.

Figure 4:
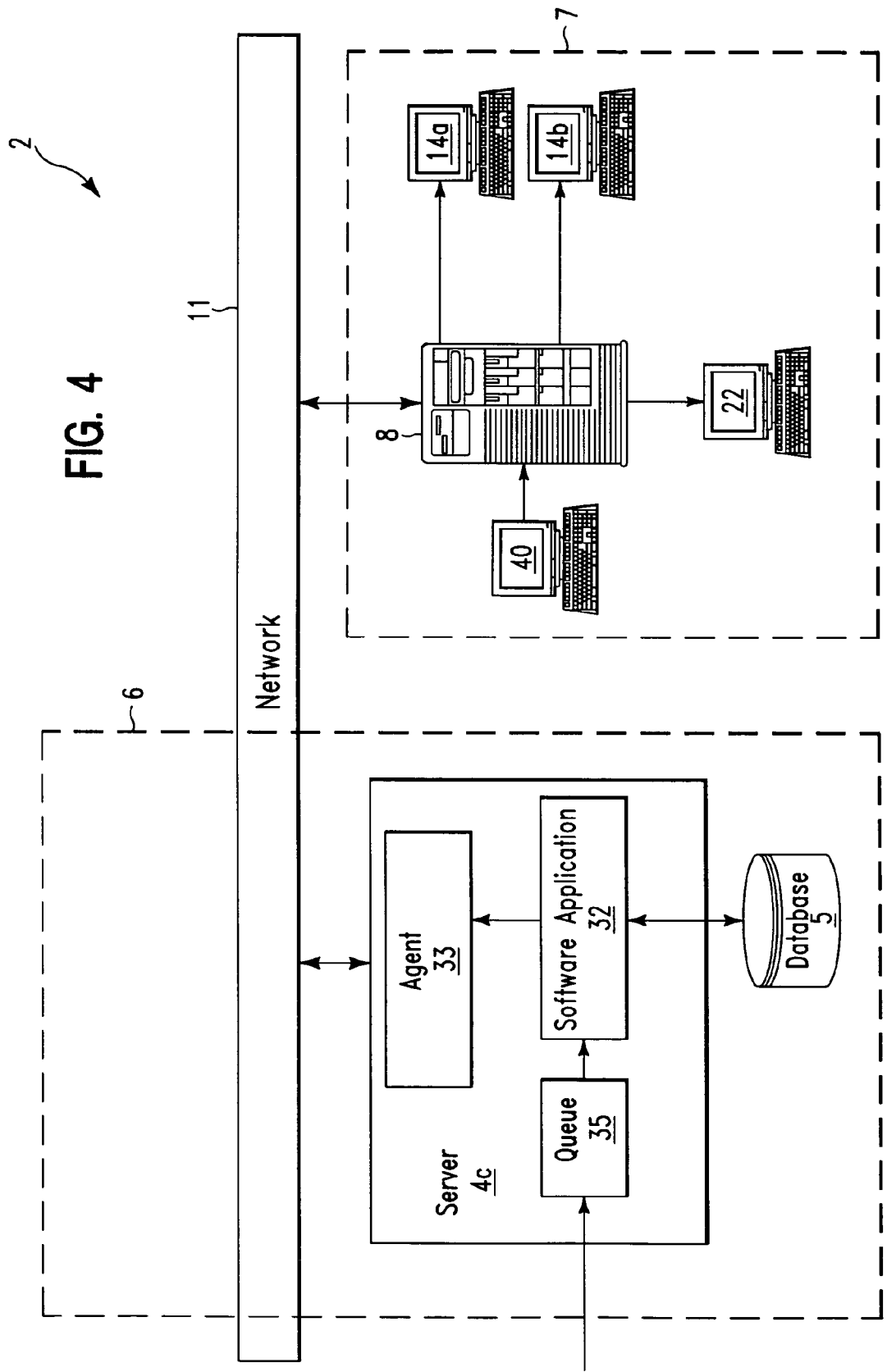
FIG. 4 illustrates a block diagram view of the system 2 of FIG. 1 comprising an exploded view of a second node comprising an agent, in accordance with embodiments of the present invention

FIG. 4 illustrates a block diagram view of the system 2 of FIG. 1 comprising an exploded view of node 4b comprising agent 33, in accordance with embodiments of the present invention. Note that the exploded view of the node 4b comprising agent 33 is an example and that the node 4b may comprise alternative configurations (e.g., multiple agents, etc). FIG. 4 depicts how an agent (e.g., agent 33) on a process queue node (e.g., node 4a) monitors an arrival of load files 27 a process time for the load files 27. The agent 33 interfaces to the monitoring server 8 and transmits (i.e., to the monitoring server 8) an event indicating a load file 27 process time. The event will be stored in a repository within the monitoring server 8 (e.g., see repository 44 in FIG. 5). Additionally, the event is received by terminals 14a and/or 14b so that support personnel may monitor load file 27 process times.

Figure 5:
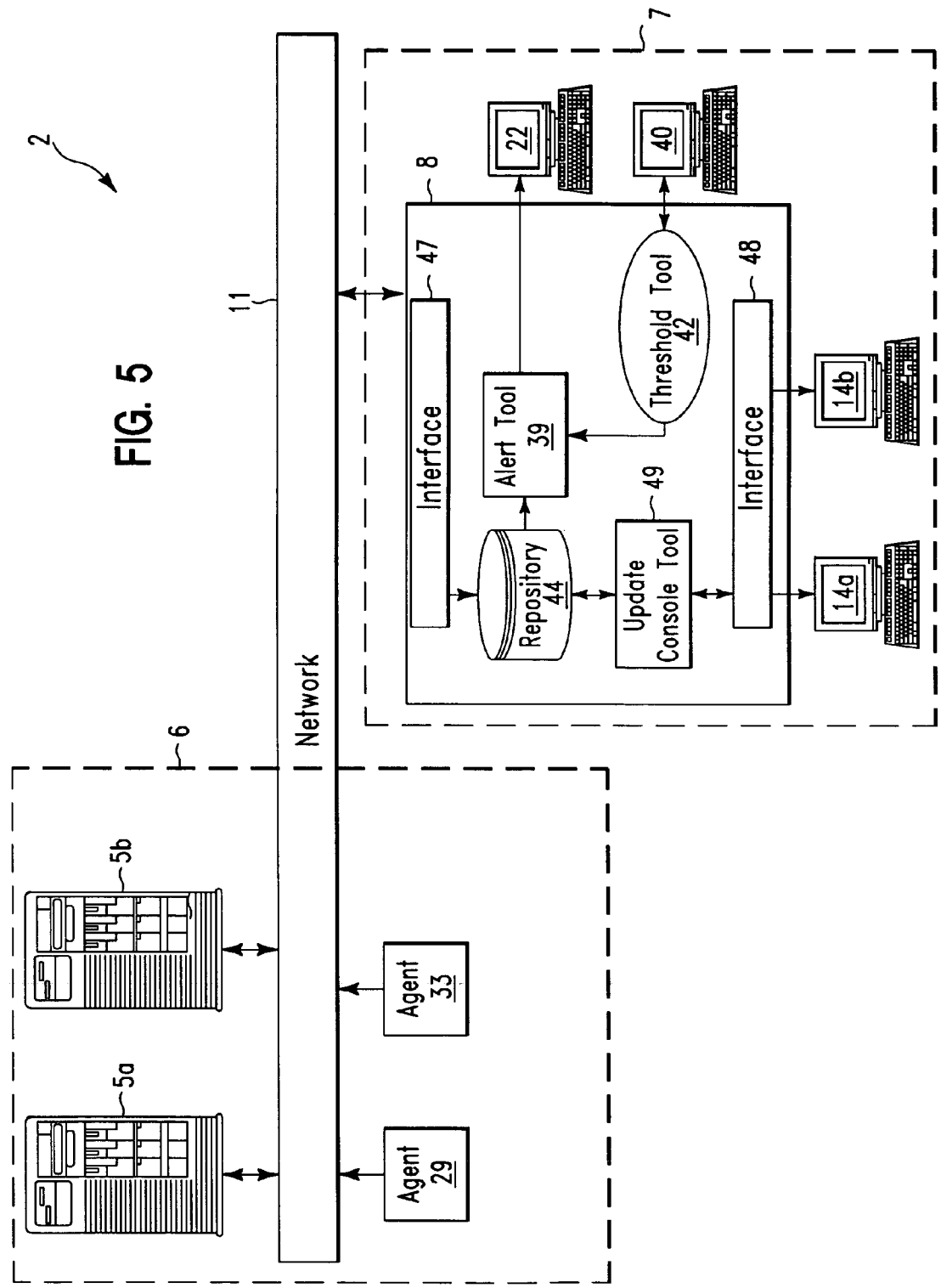
FIG. 5 illustrates a block diagram view of the system of FIG. 1 comprising an exploded view of a monitoring server, in accordance with embodiments of the present invention.

FIG. 5 illustrates a block diagram view of the system 2 of FIG. 1 comprising an exploded view of monitoring server 8, in accordance with embodiments of the present invention.

The monitoring server 8 comprises interface 47 and 48, a repository 44, an alert tool 39, an update console tool 49, and a threshold tool 42. Events are transmitted from agent 29 and/or 33 to the monitoring server 8 through the interface 47. The events are stored in the repository 44. The console update tool 49 monitors and retrieves the events from the repository 44 and connects to terminals 14 and/or 14b through the interface 48. The console update tool 49 (i.e., using the events from the repository 44) updates a health for the computing system 6. The terminals 14a and/or 14b retrieve and display the updated system health. The alert tool allows a business process owner (i.e., for the computing system 6 or an administrator for the monitoring server 8 to receive alerts (e.g., through email, instant messages, etc) if specified thresholds for the computing system 6 have been reached or exceeded. The thresholds may be specified using terminal 40 and threshold tool 42.

An example for implementation of the monitoring system 7 for monitoring a system health for the computing system 6 is described as follows:

A java batch software application receives and processes files on a gateway server (e.g., node 4a). The gateway server passes the files to an application server (e.g., node 4b) which updates database (e.g., database 5). The processed files are divided into 2 types: entity files and link files. A business owner specifies thresholds related to the files. For example, when 3 files have waited 7 minutes (i.e., a first threshold has been reached) on the gateway server, a caution alert is sent to support personnel. If 5 files have waited 12 minutes on the gateway server (i.e., a second threshold has been reached), then a problem alert is sent to support personnel. The java batch software application comprises an application that specifies countries. The java batch software application comprises an application that processes customer information records for various countries. The business owner specifies that when a link file from a specified country (e.g., the United States) comprises a process time on the application server of more than 10 minutes, an alert must be sent to support personnel. The specified thresholds are specified using the threshold tool 42 and the alerts are generated using the alert tool 39. After the thresholds have been defined, a file is loaded to the gateway server and a date/time stamp is gathered by the application server agent and written to the repository 44. The alert tool 38 monitors the repository 44 and compares conditions in the repository 44 with the defined thresholds (i.e., the first and second thresholds). Based on the monitoring by the alert tool 39 it is determined that a first file has been on the gateway server for 6½ minutes so therefore the alert tool 39 determines that the first threshold (3 files have waited 7 minutes on the gateway server) has not been reached. The alert tool 39 has determined that a second and third file have been on the gateway for more than 7 minutes thereby exceeding the first threshold and therefore the alert tool 39 generates a caution alert and transmits the caution alert to the terminal 22. If the second threshold (5 files have waited 12 minutes on the gateway server) is reached, the alert tool 39 generates a problem alert and transmits the problem alert to the terminal 22.

Figure 6:
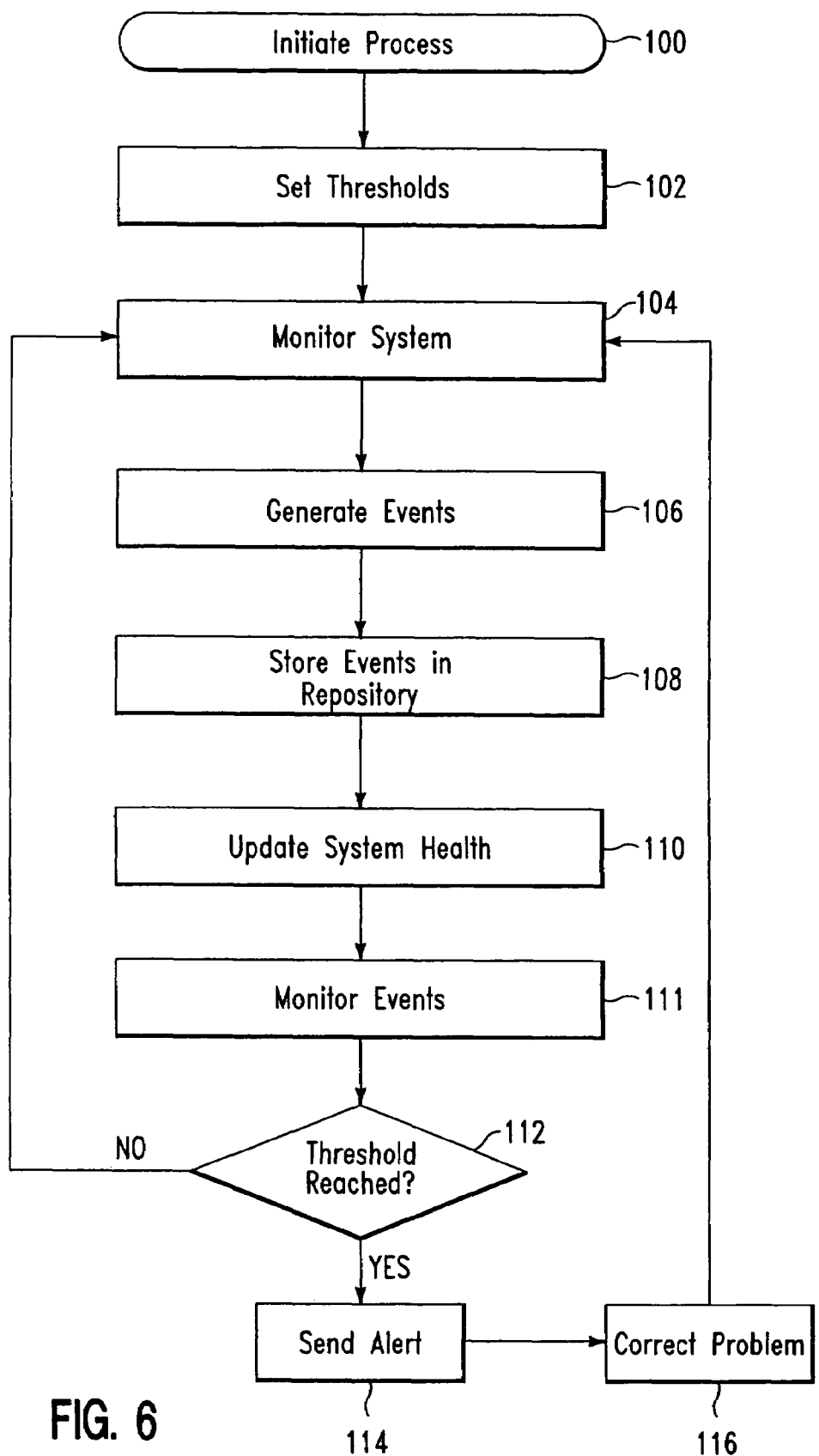
FIG. 6 is a flowchart illustrating an algorithm describing a process for monitoring the computing system of FIGS. 1-5, in accordance with embodiments of the present invention.

FIG. 6 is a flowchart illustrating an algorithm describing a process for monitoring the computing system 6 of FIGS. 1-5, in accordance with embodiments of the present invention. In step 100, the monitoring process is initiated. In step 102, thresholds are inputted into the monitoring server 8 using the terminal 40 and the threshold tool 42. In step 104, agents 29 and 33 receive monitoring data (e.g., query queues data, log errors data, logs related to data throughput) from the hardware components, software components, and interfaces within the computing system 6. In step 106 events are generated (i.e., from the monitoring data). The events are related to a health of components within the computing system 6. In step 108, the events are stored in the repository 44. In step 110, the console update tool 49 (i.e., using the events from the repository 44) updates a health for the computing system 6 and the terminals 14a and/or 14b retrieve and display the updated system health. In step 111, the alert tool 39 monitors the repository for events. In step 112, the alert tool 39 determines if specified thresholds have been reached. If in step 112 it is determined that specified thresholds have been reached then an alert is sent out in step 114, the problem is corrected in step 116 and the process repeats step 104. If in step 112 it is determined that specified thresholds have not been reached the process repeats step 104 to continue monitoring the computing system 106.

Figure 7:
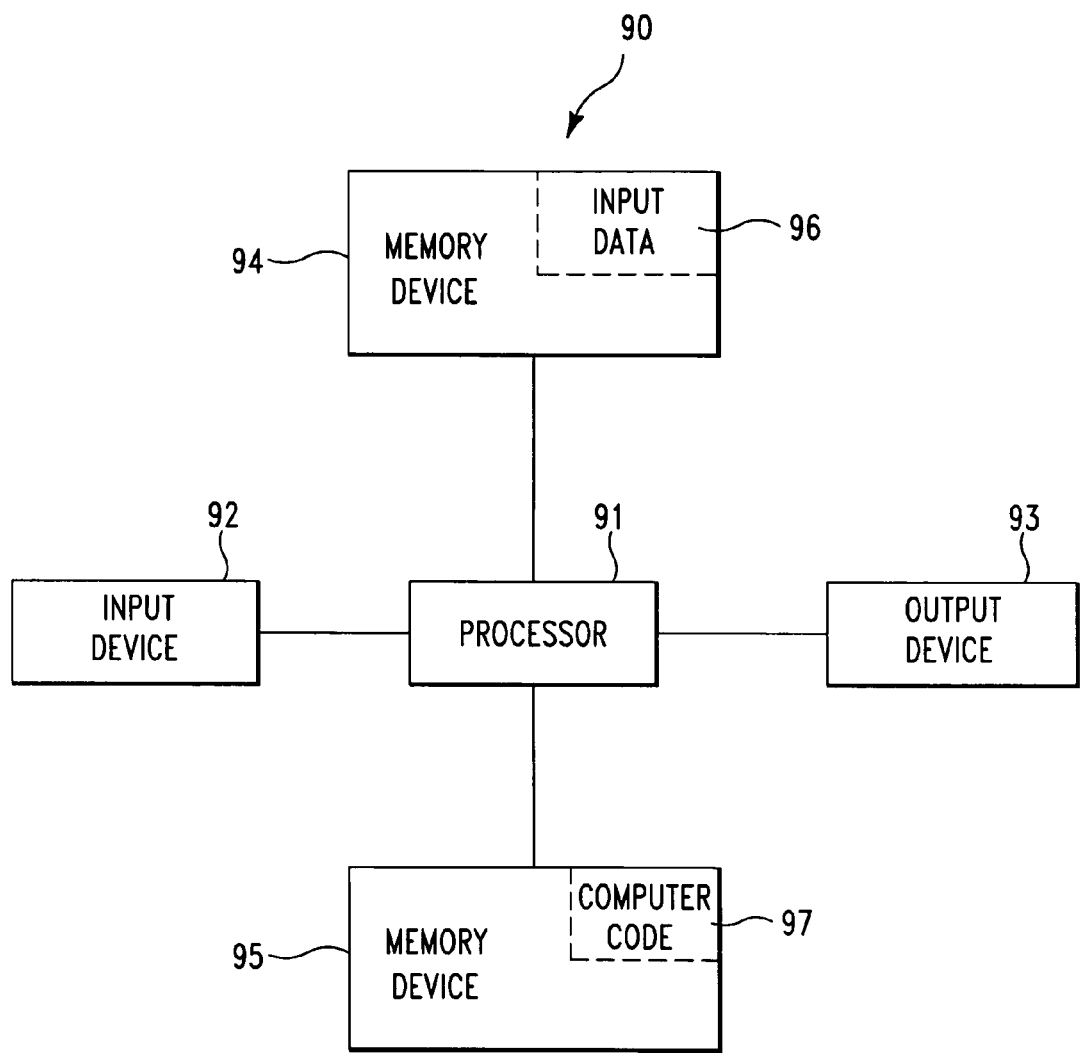
FIG.7 illustrates a computer system for monitoring the computing system of FIGS. 1-5, in accordance with embodiments of the present invention.

FIG. 7 illustrates a computer system 90 (i.e., monitoring server 8) for monitoring the computing system 6 of FIGS. 1-5, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used for monitoring the computing system 6 of FIGS. 1-5 and generating alerts. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithm of FIG. 6 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for monitoring the computing system 6 of FIGS. 1-5 and generating alerts.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
receiving, by a monitoring system, specified rules related to at least one component within a computing system, said monitoring system comprising a repository;
receiving, by said monitoring system, a first event, wherein said first event comprises first data and a first time stamp associated with an arrival time for said first data, wherein said first data comprises monitoring information related to said at least one component within said computing system;
storing said first event within said repository;
formatting said first event for transmission to a first computing terminal;
receiving, by said monitoring system, a second event, wherein said second event comprises additional data associated with an arrival of additional events;
storing said second event within said repository;
formatting said second event for transmission to said first terminal;
retreiving, by said monitoring system from said repository, said first event and said second event;
analyzing, by said monitoring system, said first event and said second event within said repository using said specified rules to determine a first health status of said at least one component; and
indicating, by said monitoring system, said first health status; and
transmitting, by said monitoring system, said first event, said second event, and said first health status to said first terminal.

2. The method of claim 1, further comprising:
sending, by said monitoring system, a notification describing said first health status to an administrator of said monitoring system.

3. The method of claim 2, wherein said sending comprises transmitting said first health status to said administrator using a sending means selected from the group consisting of an email and an instant message.

4. The method of claim 1, wherein said at least one component comprises a component selected from the group consisting of a computing apparatus, a software application, data files, a network, and a graphical user interface.

5. The method of claim 1, wherein said first data comprises a first actual threshold for said at least one component, wherein said specified rules comprise a first specified threshold for said at least one component, wherein said first analyzing comprises comparing said first actual threshold to said first specified threshold to determine said first health status, wherein said first actual threshold exceeds said first specified threshold, wherein said first health status indicates that said at least one component is in danger of malfunctioning, and wherein said method further comprises:
sending, by said monitoring system, a caution alert notification describing said first health status to an administrator of said monitoring system.

6. The method of claim 5, wherein said first actual threshold and said first specified threshold each comprise a numerical value related to a dataflow rate within said computing system.

7. The method of claim 5, wherein said first actual threshold and said first specified threshold each comprise a numerical value related to a data queue time within said computing system.

8. The method of claim 5, further comprising:
receiving, by said monitoring system, second data comprising information related to said at least one component within said computing system, wherein said receiving said second data is performed after said receiving said first event, wherein said second data comprises a second actual threshold for said at least one component, wherein said specified rules comprise a second specified threshold for said at least one component, wherein said second specified threshold is greater than said first specified threshold;
storing said second data within said repository, wherein said storing said second data is performed after said storing said first data;
analyzing, by said monitoring system, said second data within said repository using said specified rules to determine a second health status of said at least one component, wherein said analyzing said second data is performed after said analyzing said first data, wherein said analyzing said second data comprises comparing said second actual threshold to said second specified threshold to determine a second health status, wherein said second actual threshold exceeds said second specified threshold, wherein said second health status indicates that said at least one component is malfunctioning; and
sending, by said monitoring system, a problem alert notification describing said second health status to said administrator of said monitoring system, wherein said sending said problem alert notification is performed after said sending said caution alert notification.

9. The method of claim 1, wherein said indicating comprises displaying said first health status.

10. The method of claim 1, wherein said first data comprises connection status data.

11. The method of claim 1, wherein said first data comprises hardware status data.

12. The method of claim 1, wherein said first data comprises software application status data.

13. The method of claim 1, wherein said first data comprises format indicating data.

14. A monitoring system comprising a processor coupled to a computer-readable memory unit, said memory unit comprising a repository and instructions that when executed by the processor implement an monitoring method, said method comprising;
receiving, by said monitoring system, specified rules related to at least one component within a computing system, said monitoring system comprising a repository;
receiving, by said monitoring system, a first event, wherein said first event comprises first data and a first time stamp associated with an arrival time for said first data, wherein said first data comprises monitoring information related to said at least one component within said computing system;
storing said first event within said repository;
formatting said first event for transmission to a first computing terminal;
receiving, by said monitoring system, a second event, wherein said second event comprises additional data associated with an arrival of additional events;
storing said second event within said repository;
formatting said second event for transmission to said first terminal;
retreiving, by said monitoring system from said repository, said first event and said second event;

analyzing, by said monitoring system, said first event and said second event within said repository using said specified rules to determine a first health status of said at least one component; and indicating, by said monitoring system, said first health status; and transmitting, by said monitoring system, said first event, said second event, and said first health status to said first terminal.

15. The monitoring system of claim 14, wherein said method further comprises:

sending, by said monitoring system, a notification describing said first health status to an administrator of said monitoring system.

16. The monitoring system of claim 15, wherein said sending comprises transmitting said first health status to said administrator using a sending means selected from the group consisting of an email and an instant message.

17. The monitoring system of claim 14, wherein said at least one component comprises a component selected from the group consisting of a computing apparatus, a software application, data files, a network, and a graphical user interface.

18. The monitoring system of claim 14, wherein said first data comprises a first actual threshold for said at least one component, wherein said specified rules comprise a first specified threshold for said at least one component, wherein said first analyzing comprises comparing said first actual threshold to said first specified threshold to determine said first health status, wherein said first actual threshold exceeds said first specified threshold, wherein said first health status indicates that said at least one component is in danger of malfunctioning, and wherein said method further comprises:

sending, by said monitoring system, a caution alert notification describing said first health status to an administrator of said monitoring system.

19. The monitoring system of claim 18, wherein said first actual threshold and said first specified threshold each comprise a numerical value related to a dataflow rate within said computing system.

20. The monitoring system of claim 18, wherein said first actual threshold and said first specified threshold each comprise a numerical value related to a data queue time within said computing system.

21. The monitoring system of claim 18, wherein said method further comprises:

receiving, by said monitoring system, second data comprising information related to said at least one component within said computing system, wherein said receiving said second data is performed after said receiving said first event, wherein said second data comprises a second actual threshold for said at least one component, wherein said specified rules comprise a second specified threshold for said at least one component, wherein said second specified threshold is greater than said first specified threshold;

storing said second data within said repository, wherein said storing said second data is performed after said storing said first data;

analyzing, by said monitoring system, said second data within said repository using said specified rules to determine a second health status of said at least one component, wherein said analyzing said second data is performed after said analyzing said first data, wherein said analyzing said second data comprises comparing said second actual threshold to said second specified threshold to determine a second health status, wherein said second actual threshold exceeds said second specified threshold, wherein said second health status indicates that said at least one component is malfunctioning; and sending, by said monitoring system, a problem alert notification describing said second health status to said administrator of said monitoring system, wherein said sending said problem alert notification is performed after said sending said caution alert notification.

22. The monitoring system of claim 14, wherein said indicating comprises displaying said first health status.

23. The monitoring system of claim 14, wherein said first data comprises connection status data.

24. The monitoring system of claim 14, wherein said first data comprises hardware status data.

25. The monitoring system of claim 14, wherein said first data comprises software application status data.

26. The monitoring system of claim 14, wherein said first data comprises format indicating data.

27. A computer program product, comprising a computer usable medium including a repository and a computer readable program code embodied therein, said computer readable program code comprising an algorithm adapted to implement an monitoring method within a monitoring system, said method comprising:

receiving, by said monitoring system, specified rules related to at least one component within a computing system, said monitoring system comprising a repository;

receiving, by said monitoring system, a first event, wherein said first event comprises first data and a first time stamp associated with an arrival time for said first data, wherein said first data comprises monitoring information related to said at least one component within said computing system;

storing said first event within said repository;

formatting said first event for transmission to a first computing terminal;

receiving, by said monitoring system, a second event, wherein said second event comprises additional data associated with an arrival of additional events;

storing said second event within said repository;

formatting said second event for transmission to said first terminal;

retreiving, by said monitoring system from said repository, said first event and said second event;

analyzing, by said monitoring system, said first event and said second event within said repository using said specified rules to determine a first health status of said at least one component; and indicating, by said monitoring system, said first health status; and transmitting, by said monitoring system, said first event, said second event, and said first health status to said first terminal.

28. The computer program product of claim 27, wherein said method further comprises:

sending, by said monitoring system, a notification describing said first health status to an administrator of said monitoring system.

29. The computer program product of claim 28, wherein said sending comprises transmitting said first health status to said administrator using a sending means selected from the group consisting of an email and an instant message.

30. The computer program product of claim 27, wherein said at least one component comprises a component selected from the group consisting of a computing apparatus, a software application, data files, a network, and a graphical user interface.

31. The computer program product of claim 27, wherein said first data comprises a first actual threshold for said at least one component, wherein said specified rules comprise a first specified threshold for said at least one component, wherein said first analyzing comprises comparing said first actual threshold to said first specified threshold to determine said first health status, wherein said first actual threshold exceeds said first specified threshold, wherein said first health status indicates that said at least one component is in danger of malfunctioning, and wherein said method further comprises:
   sending, by said monitoring system, a caution alert notification describing said first health status to an administrator of said monitoring system.

32. The computer program product of claim 31, wherein said first actual threshold and said first specified threshold each comprise a numerical value related to a dataflow rate within said computing system.

33. The computer program product of claim 31, wherein said first actual threshold and said first specified threshold each comprise a numerical value related to a data queue time within said computing system.

34. The computer program product of claim 31, wherein said method further comprises:
   receiving, by said monitoring system, second data comprising information related to said at least one component within said computing system, wherein said receiving said second data is performed after said receiving said first event, wherein said second data comprises a second actual threshold for said at least one component, wherein said specified rules comprise a second specified threshold for said at least one component, wherein said second specified threshold is greater than said first specified threshold;
   storing said second data within said repository, wherein said storing said second data is performed after said storing said first data;
   analyzing, by said monitoring system, said second data within said repository using said specified rules to determine a second health status of said at least one component, wherein said analyzing said second data is performed after said analyzing said first data, wherein said analyzing said second data comprises comparing said second actual threshold to said second specified threshold to determine a second health status, wherein said second actual threshold exceeds said second specified threshold, wherein said second health status indicates that said at least one component is malfunctioning; arid
   sending, by said monitoring system, a problem alert notification describing said second health status to said administrator of said monitoring system, wherein said sending said problem alert notification is performed after said sending said caution alert notification.

35. The computer program product of claim 27, wherein said indicating comprises displaying said first health status.

36. The computer program product of claim 27, wherein said first data comprises connection status data.

37. The computer program product of claim 27, wherein said first data comprises hardware status data.

38. The computer program product of claim 27, wherein said first data comprises software application status data.

39. The computer program product of claim 27, wherein said first data comprises format indicating data.

40. A process for integrating computing infrastructure, comprising integrating computer-readable code into a monitoring system, wherein the code in combination with the monitoring system is capable of performing a method comprising:
   receiving, by said monitoring system, specified rules related to at least one component within a computing system, said monitoring system comprising a repository;
   receiving, by said monitoring system, a first event, wherein said first event comprises first data and a first time stamp associated with an arrival time for said first data, wherein said first data comprises monitoring information related to said at least one component within said computing system;
   storing said first event within said repository;
   formatting said first event for transmission to a first computing terminal;
   receiving, by said monitoring system, a second event, wherein said second event comprises additional data associated with an arrival of additional events;
   storing said second event within said repository;
   formatting said second event for transmission to said first terminal;
   retreiving, by said monitoring system from said repository, said first event and said second event;
   analyzing, by said monitoring system, said first event and said second event within said repository using said specified rules to determine a first health status of said at least one component; and
   indicating, by said monitoring system, said first health status; and
   transmitting, by said monitoring system, said first event, said second event, and said first health status to said first terminal.

41. The process of claim 40, wherein said method further comprises:
   sending, by said monitoring system, a notification describing said first health status to an administrator of said monitoring system.

42. The process of claim 41, wherein said sending comprises transmitting said first health status to said administrator using a sending means selected from the group consisting of an email and an instant message.

43. The process of claim 40, wherein said at least one component comprises a component selected from the group consisting of a computing apparatus, a software application, data files, a network, and a graphical user interface.

44. The process of claim 40, wherein said first data comprises a first actual threshold for said at least one component, wherein said specified rules comprise a first specified threshold for said at least one component, wherein said first analyzing comprises comparing said first actual threshold to said first specified threshold to determine said first health status, wherein said first actual threshold exceeds said first specified threshold, wherein said first health status indicates that said at least one component is in danger of malfunctioning, and wherein said method further comprises:
   sending, by said monitoring system, a caution alert notification describing said first health status to an administrator of said monitoring system.

45. The process of claim 44, wherein said first actual threshold and said first specified threshold each comprise a numerical value related to a dataflow rate within said computing system.

46. The process of claim 44, wherein said first actual threshold and said first specified threshold each comprise a numerical value related to a data queue time within said computing system.

47. The process of claim 44, wherein said method further comprises:
- receiving, by said monitoring system, second data comprising information related to said at least one component within said computing system, wherein said receiving said second data is performed after said receiving said first event, wherein said second data comprises a second actual threshold for said at least one component, wherein said specified rules comprise a second specified threshold for said at least one component, wherein said second specified threshold is greater than said first specified threshold;
- storing said second data within said repository, wherein said storing said second data is performed after said storing said first data;
- analyzing, by said monitoring system, said second data within said repository using said specified rules to determine a second health status of said at least one component, wherein said analyzing said second data is performed after said analyzing said first data, wherein said analyzing said second data comprises comparing said second actual threshold to said second specified threshold to determine a second health status, wherein said second actual threshold exceeds said second specified threshold, wherein said second health status indicates that said at least one component is malfunctioning; and
- sending, by said monitoring system, a problem alert notification describing said second health status to said administrator of said monitoring system, wherein said sending said problem alert notification is performed after said sending said caution alert notification.

48. The process of claim 40, wherein said indicating comprises displaying said first health status.

49. The process of claim 40, wherein said first data comprises connection status data.

50. The process of claim 40, wherein said first data comprises hardware status data.

51. The process of claim 40, wherein said first data comprises software application status data.

52. The process of claim 40, wherein said first data comprises format indicating data.

* * * * *

UNITED STATES PATENT AND TRADEMARK OFFICE
CERTIFICATE OF CORRECTION

Page 1 of 1

PATENT NO.         : 7,523,357 B2
APPLICATION NO.    : 11/338510
DATED              : April 21, 2009
INVENTOR(S)        : Annette Garland Irby et al.

It is certified that error appears in the above-identified patent and that said Letters Patent is hereby corrected as shown below:

On the title page, item (45) Please delete the "(*)" before Apr. 21, 2009

On the title page at item (*) Please delete: "This patent is subject to a terminal disclaimer".

Signed and Sealed this
Fourteenth Day of February, 2012

David J. Kappos
*Director of the United States Patent and Trademark Office*